July 27, 1937.                H. COLLOSEUS                2,088,233
                    POSITIVE ELECTRODE FOR GALVANIC CELLS
                         Original Filed Jan. 25, 1935

INVENTOR
Heinrich Colloseus
by Frank Reichvod
Attorney.

Patented July 27, 1937

2,088,233

UNITED STATES PATENT OFFICE 2,088,233

POSITIVE ELECTRODE FOR GALVANIC CELLS

Heinrich Colloseus, Berlin, Germany

Original application January 25, 1935, Serial No. 3,453. Divided and this application October 4, 1935, Serial No. 43,591. In Germany January 26, 1934

8 Claims. (Cl. 136—121)

This application is derived by division from an application filed by me January 25, 1935, Ser. No. 3,453.

My invention relates to improvements in positive electrodes for galvanic cells with air depolarization, and the object of the improvements is to provide a cell which may be manufactured at low cost, and in which therefore expensive raw materials such as active carbon are dispensed with. With this object in view my invention consists in manufacturing the electrode from a composition comprising a suitable loosening agent and a substance acting as a transmitter of oxygen, the said loosening agent being a porous mass which is adapted to contain the air necessary for depolarization or to have such air supplied thereto. I have discovered that an electrode comprising the said components acts as a depolarization electrode.

Figure 1:
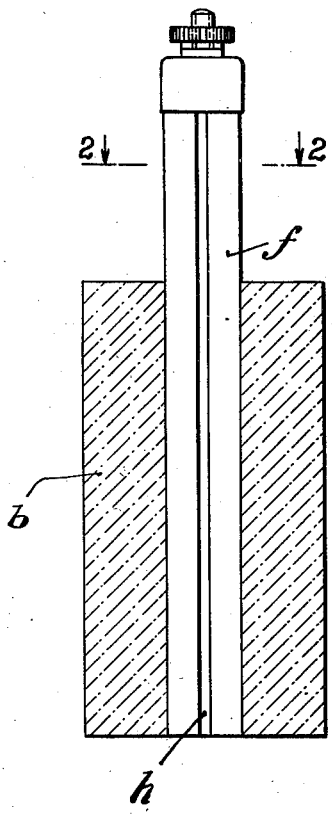
Figure 2:
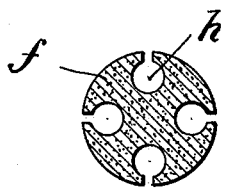

For the purpose of explaining the invention an example embodying the same has been shown in the accompanying drawing in which the same reference characters have been used in all the views to indicate corresponding parts. In said drawing Fig. 1 is a sectional elevation showing a positive electrode, and Fig. 2 is a sectional plan view taken on the line 2—2 of Fig. 1.

In the figures I have shown a high power electrode with air depolarization which consists of a core $f$ of conductive material such as carbon, having a block $b$ made from a suitable loosening substance and a substance acting as a transmitter of atmospheric oxygen placed around the same, the said block being porous so as to contain air-oxygen. As shown, the core $f$ is formed with longitudinal grooves $h$.

Suitable loosening media are petroleum coke, pumice, and infusorial earths, and therefore in the preferred form the loosening medium consists entirely or in part of the said substances. Suitable substances acting as transmitters of atmospheric oxygen are the higher oxides of the rare earths, such as cerium-potassium carbonate and vanadium pentoxide.

The loosening agent may be conductive of itself, or it may be made conductive by the addition of a suitable conductive material such as graphite.

I have found that it is advantageous to add solid sal-ammoniac to the loosening agent. Furthermore, the mixture of graphite and loosening agent may also contain a soluble gas activator such as platinum asbestos. A high capacity electrode is obtained if the mixture of graphite, loosening agent and cerium-potassium carbonate, together with the remaining substances above referred to, be placed around the conductive core $f$ made from carbon. In this case it is particularly advantageous to press the mixture firmly around the conductive core, the mixture being first moistened with the liquid electrolyte.

My improved electrode is adapted to supply strong currents, and it may be manufactured at low cost. Further, the electrodes may be manufactured without special machines, the electrode blocks being produced on the dolly presses usually employed in the manufacture of cells, and the mixture of electrodes may be prepared in mixing drums such as are now usual in the art.

I claim:

1. A positive electrode for galvanic cells with air depolarization comprising a loosening agent of conductive, inert, and porous material containing air for depolarization, and cerous potassium carbonate admixed to said loosening agent as a transmitter of atmospheric oxygen.

2. A positive electrode as claimed in claim 1, in which the loosening agent contains petroleum coke.

3. Electrode as claimed in claim 1, in which the loosening agent consists of petroleum coke.

4. Electrode as claimed in claim 1, in which the loosening agent and the cerous potassium carbonate have a gas activator admixed thereto.

5. Electrode as claimed in claim1, in which the loosening agent and the cerous potassium carbonate have platinum asbestos admixed thereto.

6. Electrode as claimed in claim 1, in which the mixture of the loosening agent and cerous potassium carbonate are placed around a conductive core.

7. Electrode as claimed in claim 1, in which the electrode comprises a conductive core, and in which the mixture of the loosening agent and the cerous potassium carbonate contain a liquid electrolyte moistening the same and are pressed around said core.

8. Electrode as claimed in claim 1, in which the mixture of the loosening agent and the cerous potassium carbonate contain solid sal ammoniac.

HEINRICH COLLOSEUS.